US008743215B1

(12) United States Patent
Lee

(10) Patent No.: US 8,743,215 B1
(45) Date of Patent: Jun. 3, 2014

(54) MURA DETECTION APPARATUS AND METHOD OF DISPLAY DEVICE

(71) Applicant: LG Display Co., Ltd., Seoul (KR)

(72) Inventor: Sang Lyn Lee, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 14/079,824

(22) Filed: Nov. 14, 2013

(30) Foreign Application Priority Data

Dec. 13, 2012 (KR) ........................ 10-2012-0145574

(51) Int. Cl.
*H04N 17/00* (2006.01)
*H04N 17/04* (2006.01)

(52) U.S. Cl.
CPC ............ *H04N 17/04* (2013.01); *H04N 17/004* (2013.01); *H04N 17/00* (2013.01)
USPC .......................................... 348/189; 348/180

(58) Field of Classification Search
CPC ..... H04N 17/00; H04N 17/004; H04N 17/04; H04N 17/02; H04N 17/045; G09G 3/006; G06T 7/0004
USPC ......... 348/184, 189, 180, 191, 607, 615, 671, 348/125, 126; 382/149, 264, 263, 275, 274; 345/89, 87, 690
IPC .................. H04N 17/00,17/02, 5/21, 5/14, 7/18
See application file for complete search history.

(56) References Cited

U.S. PATENT DOCUMENTS 5,917,935 A * 6/1999 Hawthorne et al. ........... 348/126
8,610,654 B2 * 12/2013 Kerofsky et al. .............. 348/180

* cited by examiner

*Primary Examiner* — Sherrie Hsia
(74) *Attorney, Agent, or Firm* — Morgan, Lewis & Bockius LLP

(57) ABSTRACT

Disclosed is a mura detection apparatus and method of a display device. The mura detection method includes analyzing image information acquired from a test image displayed by a display panel to detect a plurality of mura candidate areas, extracting feature information and position information of the mura candidate areas, removing non-mura according to the features of the mura candidate areas, detecting white spot mura and black spot mura on the basis of the feature information of the mura candidate areas, detecting black-and-white spot mura on the basis of the position information of the mura candidate areas, and detecting the white spot mura, the black spot mura, and the black-and-white spot mura as final mura to classify a kind, size, and position of the final mura.

10 Claims, 7 Drawing Sheets

MURA DETECTION APPARATUS AND METHOD OF DISPLAY DEVICE

CROSS-REFERENCE TO RELATED APPLICATIONS

This application claims the benefit of the Korean Patent Application No. 10-2012-0145574 filed on Dec. 13, 2012, which is hereby incorporated by reference as if fully set forth herein.

BACKGROUND

1. Field of the Invention

The present invention relates to a mura detection apparatus and method for detecting an image-quality distortion of a display device.

2. Discussion of the Related Art

As liquid crystal display (LCD) devices are enlarged in size, the size and frequency of occurrence of a mura defect, namely, a smear defect and an image-quality distortion, are increasing. Mura denotes a smear in Japanese, and denotes a defect in which when an entire screen is displayed at a constant gray scale, a specific area is non-uniformly displayed.

A related art mura detection method determines all defects, in which a contrast of a boundary is visible irrespective of a form and size of a defect, as mura. A mura defect is generally determined by an inspection using a user's eyes, but as LCD devices are enlarged in size, the existing method has a limitation in detecting the mura defect. Also, in the inspection using a user's eyes, a degree of detection of mura can be differently shown depending on a worker's workmanship, and as a screen size is enlarged, a deviation of mura detection increases FIG. 1 is a diagram schematically illustrating a related art mura detection method.

Referring to FIG. 1, a mura inspection method using SEMU developed by Semiconductor Equipment and Materials International (SEMI) was proposed for improving a mura inspection method based on a user's subjectivity.

To describe the related art mura detection method using SEMU, the mura detection method preprocesses input image data, and then displays an image in a display panel in operation S1.

Subsequently, the mura detection method inspects mura displayed in the display panel with eyes to detect a mura candidate area in operation S2.

Subsequently, a worker checks a luminance difference with respect to the background in the mura candidate area to determine the final mura, and classifies the mura by kind in operation S3.

The related art mura detection method removed a user's subjective error factor, but has a problem that a noise is detected as mura due to a non-uniformity of a luminance, caused by a characteristic of an LCD device, and foreign materials remaining in a panel.

In addition, despite that mura can occur due to various factors and features of mura candidate areas can differ, the related art cannot reflect the significance of the various features. Especially, spot-shaped mura (circular mura and oval mura) such as a black spot, a white spot, and a black-and-white spot can occur, but the existing inspection method using a worker's eyes cannot precisely detect and classify spot-shaped mura.

SUMMARY

Accordingly, the present invention is directed to provide a mura detection apparatus and method of a display device that substantially obviate one or more problems due to limitations and disadvantages of the related art.

An aspect of the present invention is directed to provide a mura detection apparatus and method of a display device.

Another aspect of the present invention is directed to provide a mura detection apparatus and method of a display device which can automatically detect and classify spot-shaped mura such as a black spot, a white spot, and a black-and-white spot.

In addition to the aforesaid objects of the present invention, other features and advantages of the present invention will be described below, but will be clearly understood by those skilled in the art from descriptions below Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a mura detection method of a display device, including: analyzing image information, acquired from a test image displayed by a display panel, to detect a plurality of mura candidate areas; extracting feature information and position information of the mura candidate areas; removing non-mura according to the features of the mura candidate areas; detecting white spot mura and black spot mura on the basis of the feature information of the mura candidate areas; detecting black-and-white spot mura on the basis of the position information of the mura candidate areas; and detecting the white spot mura, the black spot mura, and the black-and-white spot mura as final mura to classify a kind, size, and position of the final mura.

In another aspect of the present invention, there is provided a mura detection apparatus of a display device, including: an image detecting unit configured to capture a test image displayed by a display panel to generate image information; a mura candidate area detecting unit configured to analyze the image information to detect a plurality of mura candidate areas; a mura feature extracting unit configured to extract a kind, position, and size of mura of the mura candidate areas as features of the mura; a non-mura removing unit configured to verify shapes of mura candidates according to the extracted mura features to determine a foreign material and a mura candidate, caused by dust, as non-mura; a spot-shaped mura verifying unit configured to detect spot-shaped mura from among the mura candidates, and remove mura which is not the spot-shaped mura; and a mura determining and verifying unit configured to determine the spot-shaped mura, detected by the spot-shaped mura verifying unit, as final mura to classify the final mura by kind.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of a mura detection apparatus and method of a display device according to the present invention will be described in detail with reference to the accompanying drawings.

Figure 1:
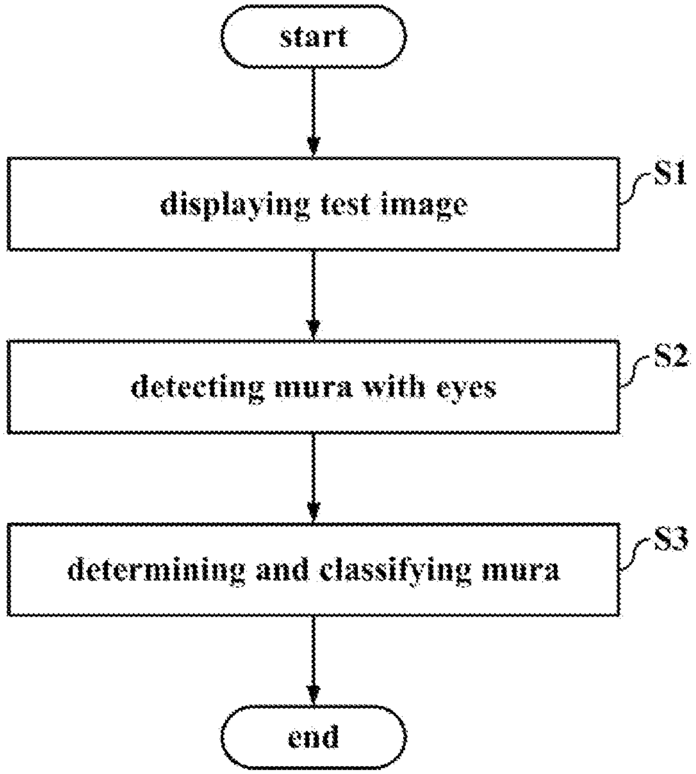
FIG. 1 Related Art
FIG. 1 is a diagram schematically illustrating a related art mura detection method.
Figure 2:
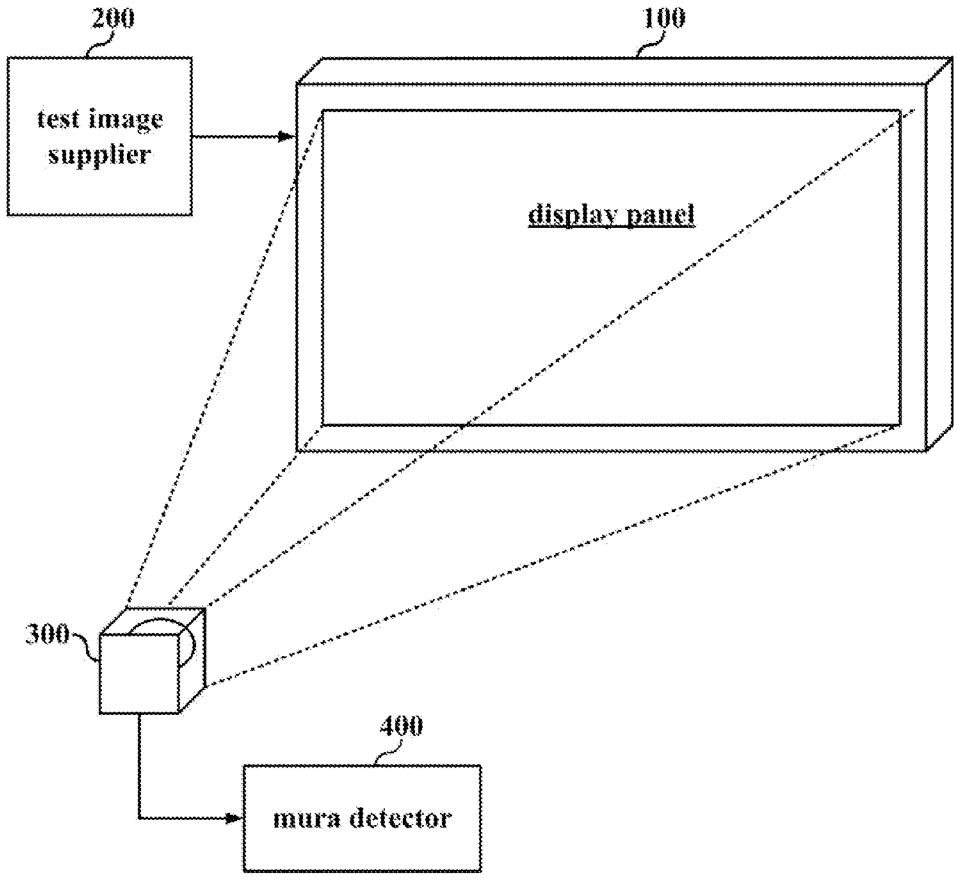
FIGS. 2 and 3 are diagrams illustrating a mura detection apparatus according to an embodiment of the present invention.
Figure 3:
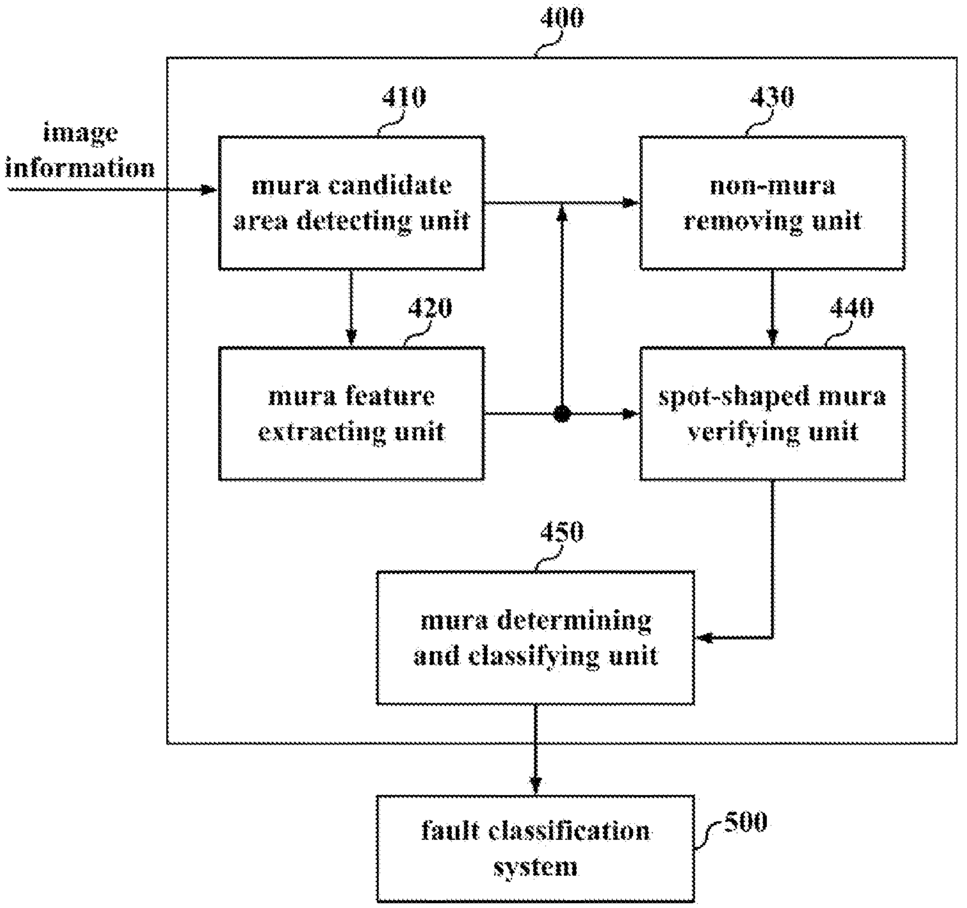
Figure 4:
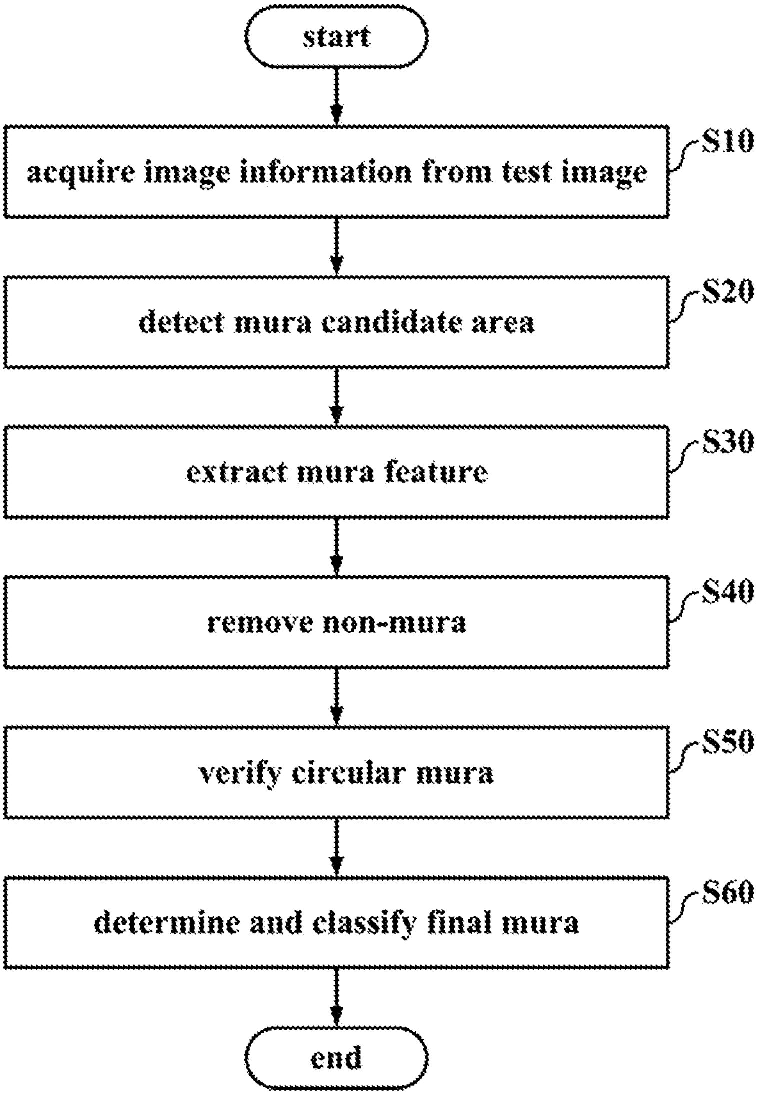
FIGS. 4 to 10 are diagrams illustrating a mura detection method according to an embodiment of the present invention.

FIGS. 2 and 3 are diagrams illustrating a mura detection apparatus according to an embodiment of the present invention.

Referring to FIGS. 2 and 3, a mura detection apparatus according to the present invention includes a test image supplier 200, an image detector 300, and a mura detector 400.

The mura detector 400 includes a mura candidate area detecting unit 410, a non-mura removing unit 430, a mura feature extracting unit 420, a spot-shaped mura verifying unit 440, and a mura determining and classifying unit 450.

A display panel 100 drives a plurality of pixels formed in a matrix type according to test image data supplied from the test image supplier 200, thereby displaying a test image.

Here, each of the plurality of pixels may be composed of sub-pixels of three or four colors. For example, the sub-pixels may be divided into a red sub-pixel, a green sub-pixel, and a blue sub-pixel, which compose one pixel.

For another example, the sub-pixels may be divided into a red sub-pixel, a green sub-pixel, a blue sub-pixel, and a white sub-pixel, which compose one pixel.

The display panel 100 may use a liquid crystal panel or an organic light emitting diode (OLED) panel.

When the display panel 100 uses the liquid crystal panel, the liquid crystal panel includes a lower substrate in which a plurality of gate lines and a plurality of data lines, which are arranged to intersect each other to thereby define the plurality of pixels, are formed, and a plurality of thin film transistors (TFTs) for turning on the respective pixels are formed. Also, the liquid crystal panel include an upper substrate in which a plurality of red, green, and blue color filters are formed, and a liquid crystal layer is formed between the lower substrate and the upper substrate.

Although not shown, a driving circuit unit for driving the display panel 100 is provided. The driving circuit unit includes a gate driver that sequentially applies a scan signal to the plurality of gate lines, a data driver that applies image data signals to the respective data lines, and a timing controller that controls the elements. Such elements are general elements, and thus, their detailed description is not provided.

The test image supplier 200 generates first to fourth test images having different grayscale values, and supplies data of the generated first to fourth test images to the display panel 100.

For example, the first test image may be displayed at a 32nd grayscale level, the second test image may be displayed at a 64th grayscale level, the third test image may be displayed at a 128th grayscale level, and the fourth test image may be displayed at a 255th grayscale level. In this case, the test image supplier 200 may sequentially align the first to fourth test images, and supply the sequentially aligned first to fourth test images to the display panel 100. Alternatively, the test image supplier 200 may supply one of the first to fourth test images to the display panel 100.

The image detector 300 captures the test image displayed by the display panel 100 to acquire image information of the text image displayed by the display panel, and supplies the acquired image information to the mura detector 400.

In detail, the image detector 300 is disposed in front of the display panel 100, and supplies the image information, acquired by capturing the test image, to the mura candidate area detecting unit 410 included in the mura detector 400.

When the first to fourth test images are displayed in the display panel 100, information of the first to fourth test images corresponding thereto is supplied to the mura candidate area detecting unit 410.

When only one of the first to fourth test images is displayed in the display panel 100, the image detector 300 generates one piece of image information corresponding thereto, and supplies the generated image information to the mura candidate area detecting unit 410. For example, the test image may be generated to display a single pattern image having a certain grayscale level (for example, a 127th grayscale level or a 200th grayscale level).

A configuration and operation of the mura detector 400 according to an embodiment of the present invention will be described in detail with reference to FIG. 3.

Figure 5:
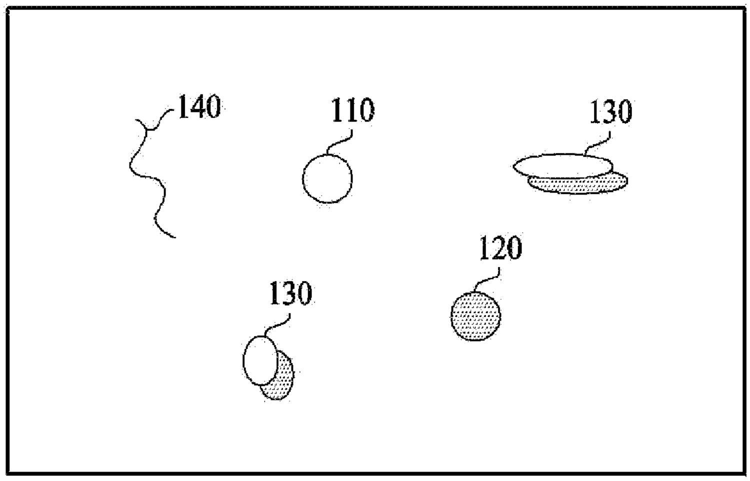

The mura candidate area detecting unit 410 analyzes the image information supplied from the image detector 300 to detect, as illustrated in FIG. 5, a plurality of mura candidate areas. The mura candidate areas may be detected in plurality according to a shape of mura, in which case an area in which white spot mura 110, black spot mura 120, black-and-white spot mura 130, and linear mura 140 occur may be detected as a mura candidate area.

In this case, the mura candidate area detecting unit 410 classifies the test image as a binary image on the basis of the image information supplied from the image detector 300, for detecting spot-shaped mura.

Here, the binary image is composed of a binary image for white-spot detection, which has the black background in order for the white spot mura 110 to be well shown, and a binary image for black-spot detection which has the white background in order for the black spot mura 120 to be well shown.

As described above, the mura candidate area detecting unit 410 detects an area, in which the white spot mura 110, the black spot mura 120, the black-and-white spot mura 130, and the linear mura 140 occur, as a mura candidate area from a text image having a single pattern grayscale level. Subsequently, the mura candidate area detecting unit 410 supplies information of the detected mura candidate areas to the non-mura removing unit 430 and the mura feature extracting unit 420.

The mura feature extracting unit 420 extracts features of the mura candidate areas on the basis of the information of the mura candidate areas supplied from the mura candidate area detecting unit 410. Here, the features of the mura candidate areas include a kind, position, and size of mura.

Specifically, as illustrated in FIG. 5, the mura feature extracting unit 420 extracts the features of the mura candidate areas on the basis of the mura candidate area information supplied from the mura candidate area detecting unit 410. The mura feature extracting unit 420 supplies the extracted feature information of mura candidates to the non-mura removing unit 430 and the spot-shaped mura verifying unit 440.

Figure 8:
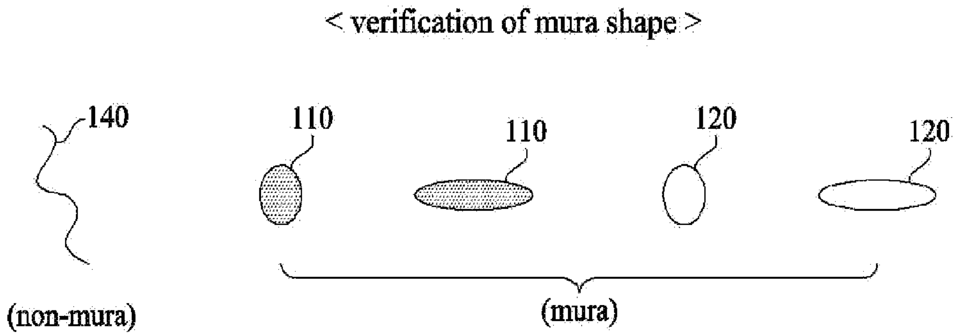

The non-mura removing unit 430, as illustrated in FIG. 8, verifies (checks) shapes of the mura candidates on the basis of the information of the mura candidate areas supplied from the mura candidate area detecting unit 410 and the feature information of the mura candidates supplied from the mura feature extracting unit 420. The non-mura removing unit 430 determines a foreign material and a mura candidate (a screen smear) caused by dust as non-mura according to the shapes of the mura candidates, and removes the non-mura from a mura candidate list.

The non-mura removing unit 430 removes the foreign material and the screen smear (caused by dust) which are not spot-shaped mura, by using shape feature information, such as a circular degree and a diagonal component, of a plurality of the mura candidates.

In detecting spot-shaped mura, since the linear mura 140 is not the spot-shaped mura, as illustrated in FIG. 8, the spot-shaped mura verifying unit 440 removes the linear mura 140 from among the white spot mura 110, the black spot mura 120, the black-and-white spot mura 130, and the linear mura 140.

Figure 6:
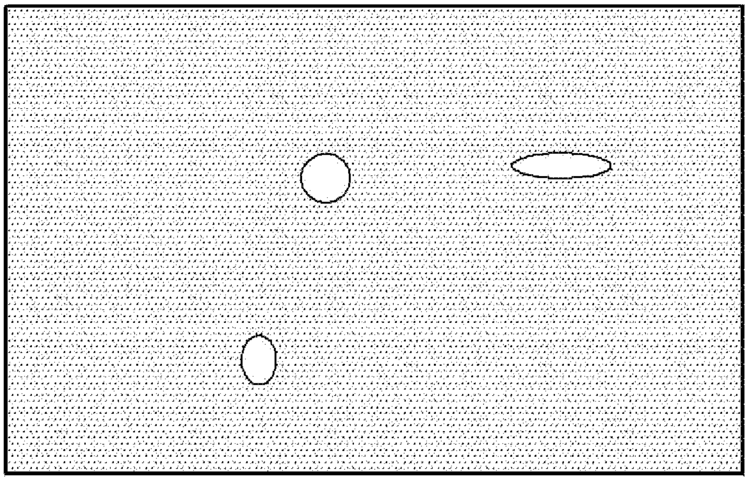
Figure 7:
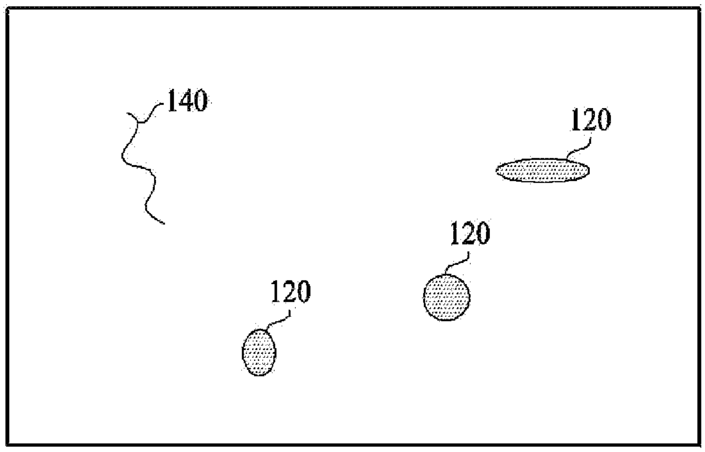
Figure 9:
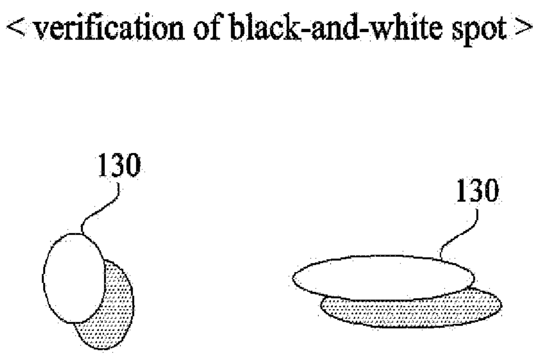

Moreover, the spot-shaped mura verifying unit 440 detects the black-and-white spot mura 130 by using position information and feature information of the mura candidates. When white spot mura of FIG. 6 and black spot mura of FIG. 7 occur in adjacent pixels, the spot-shaped mura verifying unit 440 merges the white spot mura 110 and the black spot mura 120 which occur in the adjacent pixels. That is, as illustrated in FIG. 9, the spot-shaped mura verifying unit 440 merges the white spot mura 110 and the black spot mura 120, which occur in the adjacent pixels, to detect the black-and-white spot mura 130.

Here, the black-and-white spot mura 130 may be detected on the basis of a distance difference between the white spot mura 110 and the black spot mura 120 and a rate of adjacent pixels In this case, the mura determining and classifying unit 450 may compare luminance values of the white spot mura 110, black spot mura 120, and black-and-white spot mura 130 with a predetermined reference value to determine final mural. When the luminance values of the white spot mura 110, black spot mura 120, and black-and-white spot mura 130 are equal to or greater than the reference value, the mura determining and classifying unit 450 may determine the white spot mura 110, black spot mura 120, and black-and-white spot mura 130 as the final mural.

Figure 10:
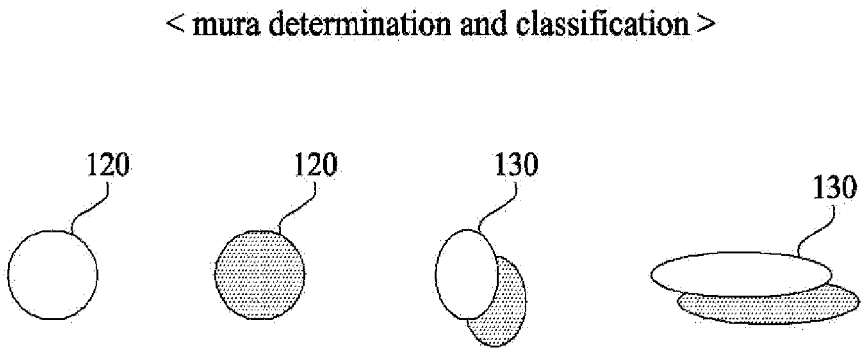

The mura determining and classifying unit 450, as illustrated in FIG. 10, determines the white spot mura 110, black spot mura 120, and black-and-white spot mura 130, which are detected by the spot-shaped mura verifying unit 440, as final spot-shaped mura, and classifies the final spot-shaped mura according to kinds of mura. The mura determining and classifying unit 450 supplies detection information and classification information by mura of the final spot-shaped mura to a fault classification system 500.

Finally, the detected mura information is supplied to the fault classification system 500, which classifies faults of products manufactured by a manufacturing process on the basis of the mura information to determine a faulty level. Accordingly, the present invention reflects the mura information in work that improves the manufacturing process, and thus can reduce faults of products and increase a yield rate.

Hereinafter, a mura detection method of a display device according to an embodiment of the present invention will be described in detail with reference to FIGS. 4 to 10.

First, the image detector 300 captures an image displayed by the display panel 100 to acquire image information in operation S10.

At this time, the test image supplier 200 generates first to fourth test images having different grayscale levels, and supplies data of the generated first to fourth test images to the display panel 100, whereupon the display panel 100 displays a test image.

In this case, the first test image may be displayed at a 32nd grayscale level, the second test image may be displayed at a 64th grayscale level, the third test image may be displayed at a 128th grayscale level, and the fourth test image may be displayed at a 255th grayscale level. In this case, the test image supplier 200 may sequentially align the first to fourth test images, and supply the sequentially aligned first to fourth test images to the display panel 100. Alternatively, the test image supplier 200 may supply one of the first to fourth test images to the display panel 100.

The image detector 300 captures the test image displayed by the display panel 100 to acquire image information of the text image displayed by the display panel, and supplies the acquired image information to the mura candidate area detecting unit 410 of the mura detector 400.

Subsequently, the mura candidate area detecting unit 410 detects an area, in which the white spot mura 110, the black spot mura 120, the black-and-white spot mura 130, and the linear mura 140 occur, as a mura candidate area from a text image having a single pattern grayscale level in operation S20.

Specifically, the mura candidate area detecting unit 410 classifies the test image as a binary image on the basis of the image information supplied from the image detector 300, for detecting spot-shaped mura.

Here, the binary image is composed of a binary image for white-spot detection, which has the black background in order for the white spot mura 110 to be well shown, and a binary image for black-spot detection which has the white background in order for the black spot mura 120 to be well shown.

The mura candidate area detecting unit 410 detects an area, in which the white spot mura 110, the black spot mura 120, the black-and-white spot mura 130, and the linear mura 140 occur, as a mura candidate area from a text image having a single pattern grayscale level.

Then, the mura candidate area detecting unit 410 supplies information of the detected mura candidate areas to the non-mura removing unit 430 and the mura feature extracting unit 420.

Subsequently, the mura feature extracting unit 420 extracts features of the mura candidate areas on the basis of the information of the mura candidate areas supplied from the mura candidate area detecting unit 410 in operation S30.

Here, the features of the mura candidate areas include a kind, position, and size of mura.

Specifically, as illustrated in FIG. 5, the mura feature extracting unit 420 extracts the features of the mura candidate areas on the basis of the mura candidate area information supplied from the mura candidate area detecting unit 410. The mura feature extracting unit 420 supplies the extracted feature information of mura candidates to the non-mura removing unit 430 and the spot-shaped mura verifying unit 440.

Subsequently, the non-mura removing unit 430, as illustrated in FIG. 8, verifies shapes of the mura candidates on the basis of the information of the mura candidate areas supplied from the mura candidate area detecting unit 410 and the feature information of the mura candidates supplied from the mura feature extracting unit 420. The non-mura removing unit 430 determines a foreign material and a mura candidate (a screen smear) caused by dust as non-mura according to the shapes of the mura candidates, and removes the non-mura from a mura candidate list in operation S40.

Subsequently, as illustrated in FIG. 8, the spot-shaped mura verifying unit 440 verifies spot-shaped mura among the white spot mura 110, the black spot mura 120, the black-and-white spot mura 130, and the linear mura 140 in operation S50.

In detail, since the linear mura 140 is not the spot-shaped mura, the spot-shaped mura verifying unit 440 removes the linear mura 140 from mura candidates.

Moreover, the spot-shaped mura verifying unit 440 detects the black-and-white spot mura 130 by using position information and feature information of the mura candidates. When white spot mura of FIG. 6 and black spot mura of FIG. 7 occur in adjacent pixels, the spot-shaped mura verifying unit 440 merges the white spot mura 110 and the black spot mura 120 which occur in the adjacent pixels.

As a result, as illustrated in FIG. 9, the spot-shaped mura verifying unit 440 merges the white spot mura 110 and the black spot mura 120, which occur in the adjacent pixels, to detect the black-and-white spot mura 130.

In this case, the mura determining and classifying unit 450 may compare luminance values of the white spot mura 110, black spot mura 120, and black-and-white spot mura 130 with a predetermined reference value to determine final mural. When the luminance values of the white spot mura 110, black spot mura 120, and black-and-white spot mura 130 are equal to or greater than the reference value, the mura determining and classifying unit 450 may determine the white spot mura 110, black spot mura 120, and black-and-white spot mura 130 as the final mural.

Finally, the number of detected mura may be freely set, and when the number of final mura is set as two, mura candidates corresponding to a first ranking and a second ranking among a plurality of mura may be detected as final mura.

Subsequently, as illustrated in FIG. 10, the mura determining and classifying unit 450 determines the white spot mura 110, black spot mura 120, and black-and-white spot mura 130, which are detected by the spot-shaped mura verifying unit 440, as final spot-shaped mura, and classifies the final spot-shaped mura according to kinds of mura in operation S60.

The mura determining and classifying unit 450 supplies detection information and classification information by mura of the final spot-shaped mura, detected through operations S10 to S60, to a fault classification system 500. The fault classification system 500 builds a database of position, size, and kind information of mura, and enables the database to be applied to improve a manufacturing process.

As described above, the mura detection apparatus and method of the display device can have an enhanced performance to detect a mura area.

Moreover, the mura detection apparatus and method of the display device can automatically detect and classify spot-shaped mura such as a black spot, a white spot, and a black-and-white spot.

Moreover, the mura detection apparatus and method of the display device can prevent mura from being excessively detected, and reduce an error deviation of mura detection.

Moreover, the mura detection apparatus and method of the display device classify faults of products manufactured by a manufacturing process, and provide a reference for determining a faulty level, thus increasing a yield rate of products.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mura detection method of a display device, comprising:

analyzing image information, acquired from a test image displayed by a display panel, to detect a plurality of mura candidate areas;

extracting feature information and position information of the mura candidate areas;

removing non-mura according to the features of the mura candidate areas;

detecting white spot mura and black spot mura on the basis of the feature information of the mura candidate areas;

detecting black-and-white spot mura on the basis of the position information of the mura candidate areas; and detecting the white spot mura, the black spot mura, and the black-and-white spot mura as final mura to classify a kind, size, and position of the final mura.

2. The mura detection method of claim 1, further comprising classifying a test image having a single pattern gray scale as a binary image on the basis of the image information to detect a white spot mura candidate area and a black spot mura candidate area.

3. The mura detection method of claim 2, wherein the binary image comprises a binary image for white-spot detection, which has a black background for the white spot mura to be well shown, and a binary image for black-spot detection which has a white background for the black spot mura to be well shown.

4. The mura detection method of claim 1, wherein the features of the mura candidate areas comprise a kind, size, and position of mura.

5. The mura detection method of claim 1, further comprising classifying mura other than spot-shaped mura as the non-mura among the mura candidate areas.

6. The mura detection method of claim 1, further comprising merging the white spot mura and the black spot mura, which occur in adjacent pixels, to detect the black-and-white spot mura on the basis of the position information of the mura candidates.

7. A mura detection apparatus of a display device, comprising:

an image detecting unit configured to capture a test image displayed by a display panel to generate image information;

a mura candidate area detecting unit configured to analyze the image information to detect a plurality of mura candidate areas;

a mura feature extracting unit configured to extract a kind, position, and size of mura of the mura candidate areas as features of the mura;

a non-mura removing unit configured to verify shapes of mura candidates according to the extracted mura features to determine a foreign material and a mura candidate, caused by dust, as non-mura;

a spot-shaped mura verifying unit configured to detect spot-shaped mura from among the mura candidates, and remove mura which is not the spot-shaped mura; and a mura determining and verifying unit configured to determine the spot-shaped mura, detected by the spot-shaped mura verifying unit, as final mura to classify the final mura by kind.

8. The mura detection apparatus of claim 7, wherein the mura candidate area detecting unit classifies a test image having a single pattern gray scale as a binary image to detect a white spot mura candidate area and a black spot mura candidate area.

9. The mura detection apparatus of claim 8, wherein the spot-shaped mura verifying unit detects white spot mura, black spot mura, and black-and-white spot mura from among the mura candidates.

10. The mura detection apparatus of claim 9, wherein the spot-shaped mura verifying unit merges the white spot mura and the black spot mura, which occur in adjacent pixels, to detect the black-and-white spot mura on the basis of the positions and features of the mura candidates.

* * * * *